(12) United States Patent
Tang (10) Patent No.: US 11,418,521 B2
(45) Date of Patent: Aug. 16, 2022

(54) INDUSTRIAL CONTROL SYSTEM MONITORING METHOD, DEVICE AND SYSTEM, AND COMPUTER-READABLE MEDIUM

(71) Applicant: Siemens Aktiengesellschaft, Munich (DE)

(72) Inventor: Wen Tang, Beijing (CN)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/417,898

(22) PCT Filed: Dec. 26, 2018

(86) PCT No.: PCT/CN2018/123911
§ 371 (c)(1),
(2) Date: Jun. 24, 2021

(87) PCT Pub. No.: WO2020/132949
PCT Pub. Date: Jul. 2, 2020

(65) Prior Publication Data
US 2022/0046033 A1 Feb. 10, 2022

(51) Int. Cl.
*H04L 9/40* (2022.01)
(52) U.S. Cl.
CPC .............................. *H04L 63/1416* (2013.01)
(58) Field of Classification Search
None
See application file for complete search history.

(56) References Cited

U.S. PATENT DOCUMENTS

| 2008/0104231 A1 | 5/2008 | Dey et al. |
| 2015/0149119 A1* | 5/2015 | Fansler .............. G05B 23/0221 |
| | | 702/189 |

(Continued)

FOREIGN PATENT DOCUMENTS

| CN | 102377740 A | * | 3/2012 |
| CN | 102377740 A | | 3/2012 |

(Continued)

OTHER PUBLICATIONS

International Preliminary Report on Patentability dated Jul. 8, 2021.
(Continued)

*Primary Examiner* — Joseph P Hirl
*Assistant Examiner* — Hassan Saadoun
(74) *Attorney, Agent, or Firm* — Harness, Dickey & Pierce, P.L.C.

(57) ABSTRACT

The present disclosure relates to a monitoring method, device and system for an industrial control system and a computer-readable medium. They are used to effectively monitor the industrial control system. The method includes: obtaining first network traffic transmitted in the industrial control system in a passive monitoring manner; determining whether it is necessary to monitor the industrial control system in an active probe manner according to characteristics of industrial devices in the industrial control system in the first network traffic; and upon determining it is necessary to monitor the industrial control system in an active probe manner, determining a target industrial device according to the characteristics of the industrial devices in the industrial control system in the first network traffic, sending third network traffic to the determined target industrial device, and obtaining second network traffic sent by the target industrial device in response to the third network traffic.

20 Claims, 4 Drawing Sheets

(56) References Cited

U.S. PATENT DOCUMENTS

2017/0093910 A1    3/2017  Gukal et al.
2017/0195462 A1*   7/2017  Kfir ........................ H04L 47/22
2019/0377311 A1*  12/2019  Abdel-Khalik ....... G06F 21/552
2020/0089204 A1    3/2020  Tang

FOREIGN PATENT DOCUMENTS

| CN | 104811437 A | * | 7/2015 | |
|---|---|---|---|---|
| CN | 104811437 A | | 7/2015 | |
| CN | 107370732 A | | 11/2017 | |
| CN | 112671553 A | * | 4/2021 | |
| CN | 107370732 B | * | 8/2021 | ........... G06K 9/6228 |
| WO | WO-2017/196216 A1 | | 11/2017 | |
| WO | WO 2018218537 A1 | | 12/2018 | |

OTHER PUBLICATIONS

PCT International Search Report and Written Opinion of International Searching Authority corresponding to PCT International Application No. PCT/CN2018/123911 filed Dec. 26, 2018.

* cited by examiner

| Reference Number | Element |
|---|---|
| S201 | Determine Monitoring Configuration |
| S202 | Obtain First Network Traffic in Passive Manner |
| S203 | Obtain Second Network Traffic in Active Probe Manner |
| S204 | Analyze Network Traffic |
| S205 | Send Obtained Network Traffic and Result of Analysis |
| S206 | Monitor Industrial Control System in Passive Manner |
| S207 | Monitor Industrial Control System in Active Probe Manner |
| 91 | Passive Monitoring Configuration |
| 92 | Active Monitoring Configuration |
| 93 | Active and Passive Combined Monitoring Configuration |

Fig. 2

| Reference Number | Element |
|---|---|
| 10 | Monitoring Device |
| 81 | First Network Traffic |
| 82 | Second Network Traffic |
| 83 | Third Network Traffic |
| 84 | Result of Analysis of Industrial Control System |
| 102 | Network Traffic Sniffer |
| 103 | Packet Capture (PCAP) Filter |
| 104 | Analyzer |
| 105a | Deep Packet Analysis (DPA) Module |
| 105b | Deep Packet Analysis (DPA) Module |
| 106 | Industrial Device Characteristics Library |
| 107 | Scheduler and Analyzer |
| 108 | Probe |
| 109 | Virtual Private Network (VPN) Client/Server |
| 110 | Data Access Point |
| 111a | First Interface |
| 111b | Second Interface |
| 111c | Third Interface |

Fig. 3

| Reference Number | Element |
|---|---|
| 10 | Monitoring Device |
| 111a | First Interface |
| 111b | Second Interface |
| 111c | Third Interface |
| 112 | At Least One Memory |
| 113 | At Least One Processor |

Fig. 4

INDUSTRIAL CONTROL SYSTEM MONITORING METHOD, DEVICE AND SYSTEM, AND COMPUTER-READABLE MEDIUM

PRIORITY STATEMENT

This application is the national phase under 35 U.S.C. § 371 of PCT International Application No. PCT/CN2018/123911 which has an International filing date of Dec. 26, 2018, the entire contents of each of which are hereby incorporated herein by reference.

FIELD

Embodiments of the application generally relate to the technical field of industrial networks and information security, in particular to a monitoring method, device and system for an industrial control system and a computer-readable medium.

BACKGROUND

An industrial control system (ICS) is widely used for remote monitoring and/or for controlling an industrial process in the industrial fields such as manufacturing, electrical power, food and medicine. Gartner applies the operation technology (OT) to ICSs and uses hardware and software for security detections so as to monitor and control physical devices and industrial processes in enterprises. For the convenience of description, OT systems, ICSs and systems for monitoring and/or controlling industrial devices and/or industrial processes are all called "industrial control systems" below.

A traditional industrial control system is often designed into a closed system in consideration of production, operation and stability and therefore the security feature is less often emphasized. It has been considered for a long time that industrial control systems depending on proprietary hardware and networks can resist network attacks. However, with the development of the technologies of automatic manufacturing and process control, information technology (IT) is widely applied to industrial control systems and industrial devices are becoming intelligent. As a result, industrial control systems are gradually turned into open systems. The operation mode of joint ventures, allied companies and service outsourcing companies also quickens the opening of industrial control systems. However, the phenomenon of network intrusion attacks has become increasingly prominent. More and more hackers and malicious software have threatened open industrial control systems, thus increasing the probability of open industrial control systems being attacked.

As critical systems monitoring and/or controlling industrial processes, industrial control systems are crucial to the security of the production of enterprises. Therefore, how to effectively monitor industrial control systems and provide a visualized solution is a problem that needs to be solved urgently in industrial fields.

SUMMARY

As mentioned above, since most of current industrial control systems lack security features and run for a long time, they are susceptible to network attacks. Therefore, an effective network monitoring method and/or tool is badly needed to guarantee the network security of industrial control systems.

In a first embodiment of the present application, a monitoring method for an industrial control system is provided. The method may be implemented by a monitoring device deployed in an industrial control system. In the method, the monitoring device first obtains first network traffic transmitted in the industrial control system in a passive monitoring manner, then determines whether it is necessary to monitor the industrial control system in an active probe manner according to characteristics of industrial devices in the industrial control system in the first network traffic, and if determining that it is necessary to monitor the industrial control system in an active probe manner, determines a target industrial device according to the characteristics of the industrial devices in the industrial control system in the first network traffic, sends third network traffic to the determined target industrial device, and obtains second network traffic sent by the target industrial device in response to the third network traffic.

In a second embodiment of the present application, a monitoring device for an industrial control system is provided. The device may comprise: at least one memory configured to store a computer-readable instruction, a first interface, a second interface and at least one processor coupled with the at least one memory. When executing the computer-readable instruction, the at least one processor is configured to: obtain first network traffic transmitted in the industrial control system through the first interface in a passive monitoring manner; determine whether it is necessary to monitor the industrial control system in an active probe manner according to characteristics of industrial devices in the industrial control system in the first network traffic; if determining that it is necessary to monitor the industrial control system in an active probe manner, determine a target industrial device according to the characteristics of the industrial devices in the industrial control system in the first network traffic, send third network traffic to the determined target industrial device through the second interface, and obtain, through the second interface, second network traffic sent by the target industrial device in response to the third network traffic.

In a third embodiment of the present application, a computer readable medium is provided, a computer-readable instruction is stored in the computer-readable medium, and a processor executes the method provided in the first embodiment when invoking the computer-readable instruction.

In a fourth embodiment of the present application, a monitoring system for an industrial control system is provided, and the monitoring system comprises: at least one monitoring device and an analysis center and/or a workstation, wherein the at least one monitoring device is configured to obtain first network traffic transmitted in the industrial control system in a passive monitoring manner; determine whether it is necessary to monitor the industrial control system in an active probe manner according to characteristics of industrial devices in the industrial control system in the first network traffic, and if determining that it is necessary to monitor the industrial control system in an active probe manner, determine a target industrial device according to the characteristics of the industrial devices in the industrial control system in the first network traffic, send third network traffic to the determined target industrial device, and obtain second network traffic sent by the target industrial device in response to the third network traffic;

send at least one of the following contents to the analysis center for an analysis and/or to the workstation: the first network traffic, the second network traffic and a result of an analysis of the industrial control system according to the first network traffic and the second network traffic.

Description of reference numerals in the drawings:

10: Monitoring device
200: Industrial control system
100: Monitoring system
20: Analysis center
20': Workstation
30: Industrial device
40: Switch
50: LAN
60: Engineer
S201: Determine the monitoring configuration
91: Passive monitoring configuration
92: Active monitoring configuration
93: Active and passive combined monitoring configuration
S202: Obtain first network traffic 81 transmitted in the industrial control system 200 in a passive monitoring manner
S203: Obtain second network traffic 82 transmitted in the industrial control system 200 in an active probe manner
S204: Analyze the obtained network traffic
S205: Send the obtained network traffic and the result of the analysis to an analysis center 20 and/or to a workstation 20'
S206: Monitor the industrial control system 200 in a passive monitoring manner
S207: Monitor the industrial control system 200 in an active probe manner
102: Network traffic sniffer
104: Basic analyzer
106: Industrial device characteristics library
103: Packet capture (PCAP) filter
105a, 105b. . .: Deep packet analysis (DPA) module for protocol 1, protocol 2 . . .
107: Scheduler and analyzer
108: Probe
110: Data access point
109: Virtual private network (VPN) client/server
81: First network traffic
82: Second network traffic
83: Third network traffic
84: Result of an analysis of the industrial control system 200 according to the first network traffic 81 and/or the second network traffic 82
111a: First interface
111b: Second interface
111C: Third interface
112: At least one memory
113: At least one processor

DETAILED DESCRIPTION OF THE EXAMPLE EMBODIMENTS

In a first embodiment of the present application, a monitoring method for an industrial control system is provided. The method may be implemented by a monitoring device deployed in an industrial control system. In the method, the monitoring device first obtains first network traffic transmitted in the industrial control system in a passive monitoring manner, then determines whether it is necessary to monitor the industrial control system in an active probe manner according to characteristics of industrial devices in the industrial control system in the first network traffic, and if determining that it is necessary to monitor the industrial control system in an active probe manner, determines a target industrial device according to the characteristics of the industrial devices in the industrial control system in the first network traffic, sends third network traffic to the determined target industrial device, and obtains second network traffic sent by the target industrial device in response to the third network traffic.

Wherein, based on the characteristics of industrial devices in the network traffic obtained in a passive monitoring manner, the monitoring device can determine a target industrial device and/or characteristics to be further obtained. Therefore, the monitoring device can obtain targeted network traffic in an active probe manner, avoiding the production of a large amount of extra network traffic and influencing to a lesser extent the running of the industrial control system and industrial devices. Meanwhile, the monitoring device can obtain required characteristics. With the running of the industrial control system less influenced, the monitoring device effectively obtains and analyzes characteristics.

Alternatively, if determining that a new industrial device is accessed to the industrial control system according to the characteristics of the industrial devices in the industrial control system in the first network traffic, the monitoring device determines whether it is necessary to adopt an active probe manner for the industrial control system to obtain second network traffic transmitted in the industrial control system and uses the newly accessed industrial device as the target industrial device. Alternatively, if determining that the characteristics of the industrial devices in the industrial control system are changed according to the characteristics of the industrial devices in the industrial control system in the first network traffic, the monitoring device determines whether it is necessary to adopt an active probe manner for the industrial control system to obtain second network traffic transmitted in the industrial control system and uses the industrial device whose characteristics are changed as the target industrial device.

Wherein, when determining that a new industrial device is accessed to the industrial control system and/or the characteristics of industrial devices are changed according to the characteristics extracted from the network traffic obtained in a passive monitoring manner, the monitoring device uses the newly accessed industrial device and the industrial device whose characteristics are changed as the target industrial device, and obtains the characteristic of the target industrial device in an active probe manner. As a result, the active probe can be more targeted, the dynamic changes of the industrial control system can be tracked in real time and the latest information of the industrial control system can be obtained.

Alternatively, the monitoring configuration may be first determined to be one of the following for the method: passive monitoring configuration, active monitoring configuration, and active and passive combined monitoring configuration. If determining the monitoring configuration as the active and passive combined monitoring configuration, the monitoring device performs the steps of obtaining first network traffic transmitted in the industrial control system in a passive monitoring manner and determining whether it is necessary to monitor the industrial control system in an active probe manner according to characteristics of industrial devices in the industrial control system in the first network traffic, and if determining that it is necessary to monitor the industrial control system in an active probe manner, performs the steps of determining a target industrial device according to the characteristics of the industrial devices in the industrial control system in the first network traffic, sending third network traffic to the determined target industrial device, and obtaining second network traffic sent by the target industrial device in response to the third network traffic; if determining the monitoring configuration as the passive monitoring configuration, the monitoring device monitors the industrial control system only in a passive monitoring manner; if determining the monitoring configuration as the active monitoring configuration, the monitoring device monitors the industrial control system only in an active probe manner.

In this way, the monitoring manner can flexibly be configured to adapt to different application scenarios.

Alternatively, in the method, the monitoring device may further send at least one of the following contents to an analysis center for an analysis and/or to a workstation through a third interface:
the first network traffic;
the second network traffic;
a result of an analysis of the industrial control system according to the first network traffic and/or the second network traffic.

The analysis center or workstation can make further analyses.

In a second embodiment of the present application, a monitoring device for an industrial control system is provided. The device may comprise: at least one memory configured to store a computer-readable instruction, a first interface, a second interface and at least one processor coupled with the at least one memory. When executing the computer-readable instruction, the at least one processor is configured to: obtain first network traffic transmitted in the industrial control system through the first interface in a passive monitoring manner; determine whether it is necessary to monitor the industrial control system in an active probe manner according to characteristics of industrial devices in the industrial control system in the first network traffic; if determining that it is necessary to monitor the industrial control system in an active probe manner, determine a target industrial device according to the characteristics of the industrial devices in the industrial control system in the first network traffic, send third network traffic to the determined target industrial device through the second interface, and obtain, through the second interface, second network traffic sent by the target industrial device in response to the third network traffic.

Wherein, based on the characteristics of industrial devices in the network traffic obtained in a passive monitoring manner, the monitoring device can determine a target industrial device and/or characteristics to be further obtained. Therefore, the monitoring device can obtain targeted network traffic in an active probe manner, avoiding the production of a large amount of extra network traffic and influencing to a lesser extent the running of the industrial control system and industrial devices. Meanwhile, the monitoring device can obtain required characteristics. With the running of the industrial control system less influenced, the monitoring device effectively obtains and analyzes characteristics.

Alternatively, when determining whether it is necessary to monitor the industrial control system in an active probe manner according to characteristics of industrial devices in the industrial control system in the first network traffic, the at least one processor is specifically configured to determine whether it is necessary to adopt an active probe manner for the industrial control system to obtain second network traffic transmitted in the industrial control system if determining that a new industrial device is accessed to the industrial control system according to the characteristics of the industrial devices in the industrial control system in the first network traffic; when determining a target industrial device, the at least one processor is specifically configured to use the newly accessed industrial device as the target industrial device.

Alternatively, when determining whether it is necessary to monitor the industrial control system in an active probe manner according to characteristics of industrial devices in the industrial control system in the first network traffic, the at least one processor is specifically configured to determine whether it is necessary to adopt an active probe manner for the industrial control system to obtain second network traffic transmitted in the industrial control system if determining that the characteristics of the industrial devices in the industrial control system are changed according to the characteristics of the industrial devices in the industrial control system in the first network traffic; when determining a target industrial device, the at least one processor is specifically configured to use the industrial device whose characteristics are changed as the target industrial device.

Wherein, when determining that a new industrial device is accessed to the industrial control system and/or the characteristics of industrial devices are changed according to the characteristics extracted from the network traffic obtained in a passive monitoring manner, the monitoring device uses the newly accessed industrial device and the industrial device whose characteristics are changed as the target industrial device, and obtains the characteristic of the target industrial device in an active probe manner. As a result, the active probe can be more targeted, the dynamic changes of the industrial control system can be tracked in real time and the latest information of the industrial control system can be obtained.

Alternatively, the at least one processor is further configured to determine the monitoring configuration as one of the following:
passive monitoring configuration;
passive monitoring configuration;
active and passive combined monitoring configuration;
the at least one processor is specifically configured to obtain, through the first interface, first network traffic transmitted in the industrial control system in a passive monitoring manner and determine whether it is necessary to monitor the industrial control system in an active probe manner according to characteristics of industrial devices in the industrial control system in the first network traffic if determining the monitoring configuration as the active and passive combined monitoring configuration, and determine a target industrial device according to the characteristics of the industrial devices in the industrial control system in the first network traffic, send third network traffic to the determined target industrial device through the second interface, and obtain, through the second interface, second network traffic sent by the target industrial device in response to the third network traffic if determining that it is necessary to monitor the industrial control system in an active probe manner;
the at least one processor is further configured to monitor the industrial control system only in a passive monitoring manner if determining the monitoring configuration as the passive monitoring configuration, and monitor the industrial control system only in an active probe manner if determining the monitoring configuration as the active monitoring configuration.

In this way, the monitoring manner can flexibly be configured to adapt to different application scenarios.

Alternatively, the device may further comprise a third interface, and the at least one processor is further configured to send at least one of the following contents to an analysis center for an analysis and/or to a workstation through a third interface:
the first network traffic;
the second network traffic;
a result of an analysis of the industrial control system according to the first network traffic and/or the second network traffic.

The analysis center or workstation can make further analyses.

In a third embodiment of the present application, a computer readable medium is provided, a computer-readable instruction is stored in the computer-readable medium, and a processor executes the method provided in the first embodiment when invoking the computer-readable instruction.

In a fourth embodiment of the present application, a monitoring system for an industrial control system is provided, and the monitoring system comprises: at least one monitoring device and an analysis center and/or a workstation, wherein the at least one monitoring device is configured to obtain first network traffic transmitted in the industrial control system in a passive monitoring manner; determine whether it is necessary to monitor the industrial control system in an active probe manner according to characteristics of industrial devices in the industrial control system in the first network traffic, and if determining that it is necessary to monitor the industrial control system in an active probe manner, determine a target industrial device according to the characteristics of the industrial devices in the industrial control system in the first network traffic, send third network traffic to the determined target industrial device, and obtain second network traffic sent by the target industrial device in response to the third network traffic; send at least one of the following contents to the analysis center for an analysis and/or to the workstation: the first network traffic, the second network traffic and a result of an analysis of the industrial control system according to the first network traffic and the second network traffic.

Over the past decades, the information technology and communication technologies, for example, transport control protocol (TCP)/Internet protocol (IP) widely applied in industrial control systems, and commercial Windows operating systems, have been more and more widely applied in industrial control systems. However, different from an IT system, an industrial control system has the following characteristics:
controlling a physical process in a crucial environment, and higher requirements for security and process protection
a life cycle of 10 years to 15 years
higher availability, integrity and confidentiality
high certainty of system and network behaviors
more time-sensitive application, more strict response time, and no high delay or jitter allowed
simple data type, high data transmission rate, and real-time analysis required
network consisting of human-machine interfaces (HMIs), sensors, input/output (I/O), special-purpose controllers (programmable logical controller (PLC) and remote terminal unit (RTU)), and contact screens
strict restart time after patching and great influence of patching on the industrial control system The environment of the industrial control system becomes increasingly complex and changes dynamically. Therefore, there is an increasing demand on the automatic detection and monitoring of equipment and the visualization of the establishment and maintenance of the environment of the industrial control system.

In the embodiments of the present invention, a monitoring method, device and system for an industrial control system are provided based on the above-mentioned characteristics of the industrial control system. Wherein, the advantages of the active and passive network monitoring are combined, a distributed monitoring device (for example, network sensor) realizes the extraction and analysis of data, and the visualization of the industrial control system is realized by obtaining characteristics of industrial devices in the industrial control system.

To help understand the embodiments of the present invention, the concepts involved are explained below. These explanations should not be considered to limit the scope of protection of the present invention.

1. Industrial Control System

As mentioned above, an industrial control system is used for remote monitoring and/or for controlling an industrial process. The industrial control system is also known as OT system or ICS.

Examples of an industrial control system include a supervisory control and data acquisition (SCADA) system, a distributed control system (DCS), a computer numerical control (CNC) system (including computerized mechanical tool) and a scientific device (for example, a digital oscilloscope).

An industrial control system may include but is not limited to the following industrial devices:
Industrial controller
For example, a programmable logic controller (PLC) and a programmable automation controller (PAC).
Field device
For example, a sensor and an electric motor. The sensor can acquire field data such as temperature, humidity, pressure and flow rate of a fluid under the control of the industrial controller. The electric motor can drive a motion under the control of the industrial controller.
Industrial host
For example, an engineer station (ES), an operator station (OS), a human-machine interface (HMI), a database server and an application server.
Security protection equipment (optional)
For example, a firewall and a server for intrusion detection. Wherein, the security and fire protection equipment such as firewall and server for intrusion detection can also form an intrusion detection system (IDS) to realize intrusion detections for the industrial control system.
Network switching and routing equipment
For example, an industrial switch and an industrial router. The network switching and routing equipment may form an industrial Ethernet to realize the interconnection of equipment in the industrial control system.

2. Devices and Assets

Industrial devices in an industrial control system may also be called "assets".

3. Characteristics of Industrial Devices

In the embodiments of the present invention, the monitoring device can obtain the characteristics of industrial devices from the acquired network traffic, and these characteristics include but are not limited to:

basic characteristics of Ethernet, Internet protocol (IP), transport control protocol (TCP) and data datagram protocol (UDP), for example, media access control (MAC) address, IP address, and TCP/UDP port No. (corresponding to the service provided by an industrial device 30).

Information such as device type, hardware version and firmware version may be acquired from the payload in a link layer discovery protocol frame, and information such as type identifier may be acquired from the OT protocol of Siemens S7Comm.

4. Passive Monitoring Manner and Active Probe Manner

Currently, the monitoring manners for a network or a system are roughly classified into an active probe manner and a passive monitoring manner. Either the active probe manner or the passive monitoring manner includes various types, and various types are respectively applicable to specific scenarios because their availability, characteristics, capabilities and disadvantages are different.

Wherein, in the active probe manner, the feedback of a network is measured or monitored by sending network traffic of a detection to the network. Since network devices can actively be accessed, more device characteristics can be obtained in the active probe manner. However, since extra network traffic needs to be sent in the network, a large amount of extra network traffic may be produced if the network is not well understood, thus influencing the normal running of the network and the network devices therein.

In the passive monitoring manner, only the network traffic transmitted over the network is monitored, and no extra network traffic will be injected into the target network by using a device connected to the network to capture the network traffic for an analysis. However, if the monitored network traffic contains no characteristics required for devices and assets, it is difficult to obtain a large amount of network traffic available for analyses in the passive monitoring manner and the applications of the passive monitoring manner are also restricted.

In the embodiments of the present invention, the advantages of the active probe manner and the passive monitoring manner are combined. With a small amount of network traffic of a detection injected, the operator of the industrial control system can learn the condition of the network security in real time, realizing security situation awareness. In addition, the running of the industrial control system is less influenced. The solution provided based on the embodiments of the present invention can realize the statement of assets, topology discovery, change monitoring, network/application behavior monitoring and operation monitoring, realize continuous monitoring of an industrial control system and effectively improve the visibility of the industrial control system.

The following describes in detail the embodiments of the present invention in combination with the drawings.

Figure 1A:
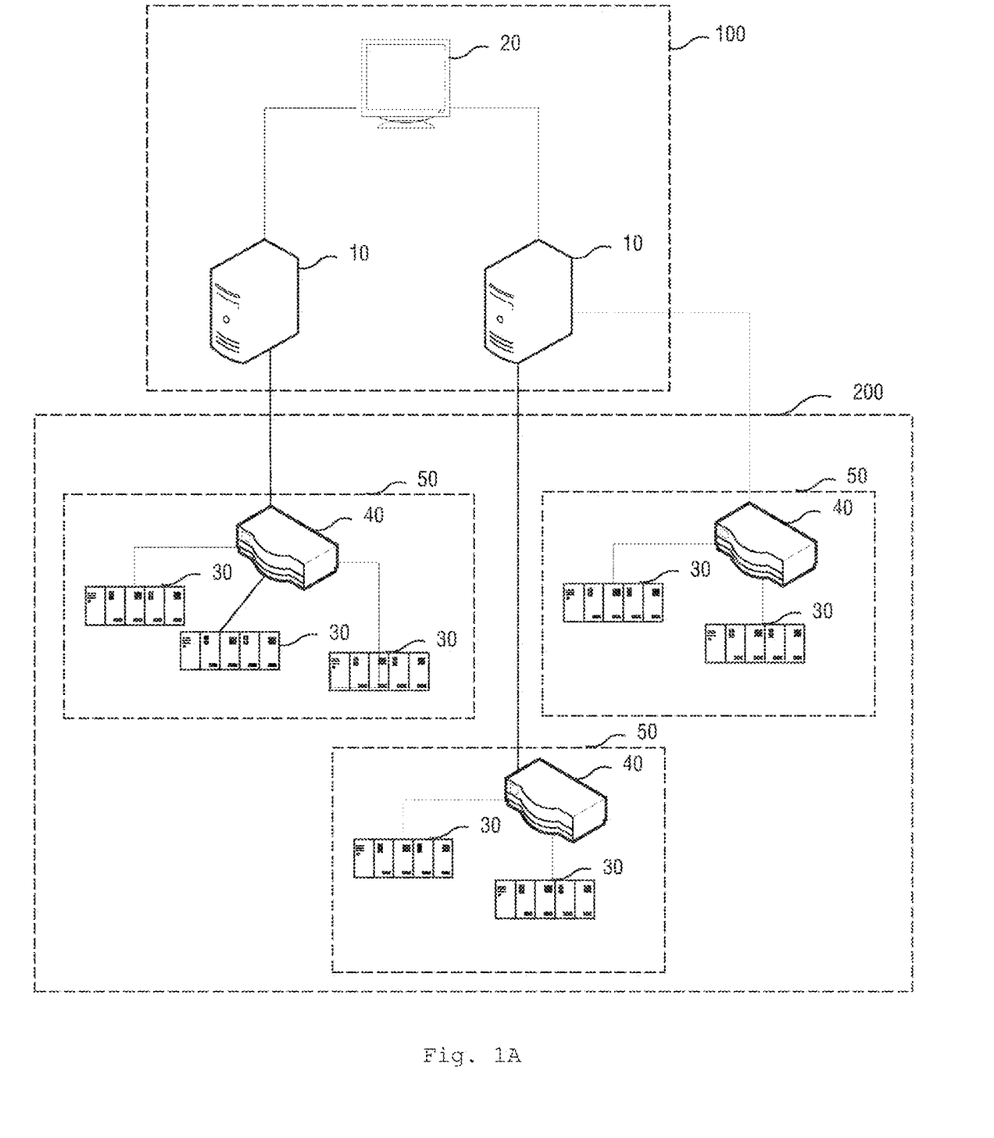
FIGS. 1A and 1B show the structure of the monitoring system for an industrial control system provided in one embodiment of the present invention.
Figure 1B:
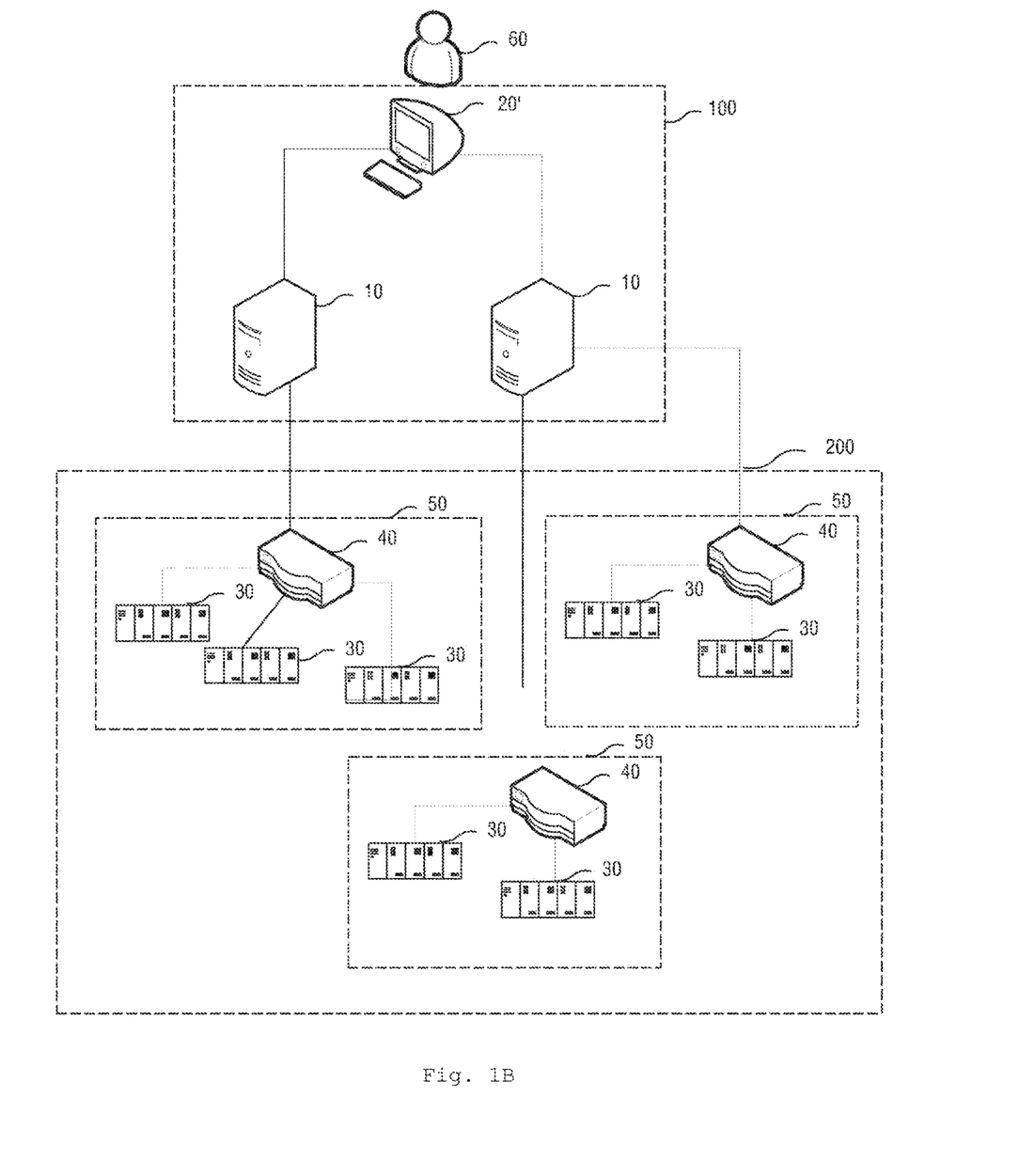

FIGS. 1A and 1B show the structure of the monitoring system 100 for an industrial control system 200 provided in one embodiment of the present invention. As shown in the figures, the monitoring system 100 may comprise at least one monitoring device 10 and at least one analysis center 20 (as shown in FIG. 1A) or at least one workstation 20' (as shown in FIG. 1B). Wherein, the monitoring system 100 may also comprise one analysis center 20 and at least one workstation 20'.

Wherein, the at least one monitoring device 10 (for example, network sensor) can be deployed in the industrial control system 200. Alternatively, one or more monitoring devices 10 may be configured for each local area network (LAN), wherein one LAN may comprise one or more interconnected switches and/or routers. The network interfaces of the monitoring device 10 for monitoring the industrial control system 200 are connected to a LAN, and port mirroring is configured on the switches or routers of the LAN or a monitoring device is deployed on the switches or routers by use of wire monitoring to acquire the network traffic (including incoming and outgoing network traffic in the LAN) transmitted in the LAN.

Figure 4:
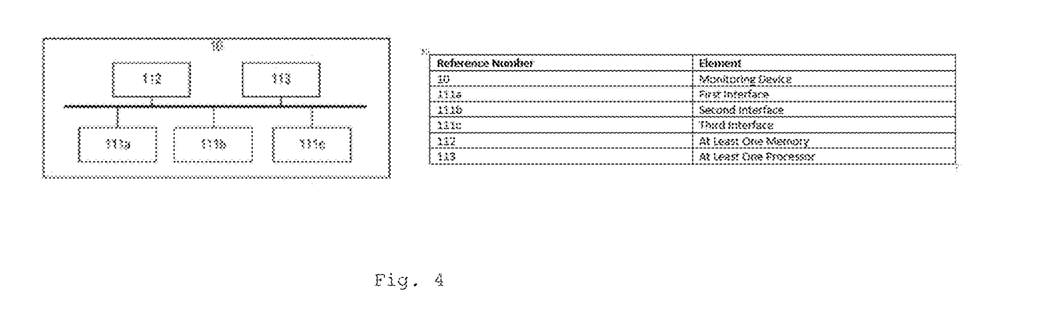

As shown in FIG. 4, one monitoring device 10 may comprise 2 to 3 interfaces in terms of hardware composition:
  a first interface 111a
  Through the first interface 111a, the monitoring device can obtain network traffic transmitted in a LAN of the connected industrial control system 200.
  a second interface 111b
  Through the second interface 111b, the monitoring device can send detection packets or frames to a LAN of the connected industrial control system 200 to obtain device characteristics of industrial devices in the connected LAN.
  a third interface 111c (optional)
  Through the third interface 111c, the monitoring device can send at least one of the following contents to an analysis center 20 and/or a workstation 20':
  network traffic obtained in the passive monitoring manner, called "first network traffic 81";
  network traffic obtained in the active probe manner, called "second network traffic 82";
  result of an analysis of the industrial control system 200 according to the above-mentioned first network traffic 81 and/or second network traffic 82, called "result 84 of an analysis", for example, characteristics of industrial devices 30 in the LAN obtained from the first network traffic 81 and/or second network traffic 82.

Wherein, an engineer 60 can obtain the above-mentioned characteristics through a workstation 20'.

Alternatively, the second interface 111b and the third interface 111c may also be implemented by a hardware interface. That is to say, the monitoring device 10 may obtain network traffic in the active probe manner through the third interface 111c.

In terms of hardware implementation, as shown in FIG. 4, the monitoring device 10 may further comprise at least one memory 112 and at least one processor 113 coupled with the at least one memory 112. The at least one memory 112 is configured to store a computer-readable instruction, and alternatively, store network traffic obtained by the monitoring device 10 and the result of an analysis of the network traffic obtained by the monitoring device 10. The at least one processor 113 is configured to implement the monitoring and analysis functions of the monitoring device 10 when executing the computer-readable instruction stored in the at least one memory 112. For example, the at least one processor obtains network traffic and sends network traffic and the result of an analysis through the above-mentioned interfaces. Again for example, the at least processor implements the function of monitoring configuration.

The monitoring device 10 may have the following three monitoring configurations:
  passive monitoring configuration 91;
  active monitoring configuration 92;
  active and passive combined monitoring configuration 93.

The monitoring configurations may be set through a software switch. A monitoring configuration may be set in advance in the factory or may flexibly be changed in service according to the practical application scenario.

Wherein, if the monitoring configuration is the passive monitoring configuration 91, the monitoring device 10 monitors the industrial control system 200 only in the passive monitoring manner. In the passive monitoring configuration 91, the monitoring device 10 only needs to comprise the above-mentioned first interface 111a, and alternatively may further comprise the above-mentioned third interface 111c. The monitoring device 10 analyzes the obtained network traffic, for example, obtains characteristics of industrial devices and sends the obtained characteristics of industrial devices to an analysis center 20 and/or a workstation 20' through the third interface 111c.

If the monitoring configuration is the active monitoring configuration 92, the monitoring device 10 monitors the industrial control system 200 only in the active probe manner. In the active monitoring configuration 92, the monitoring device 10 only needs to comprise the above-mentioned second interface 111b and third interface 111c. The monitoring device 10 analyzes the network traffic obtained in the active probe manner, for example, performs a depth analysis to extract characteristics of industrial devices and sends the obtained characteristics of industrial devices to an analysis center 20 and/or a workstation 20' through the third interface 111c.

If the monitoring configuration is the active and passive combined monitoring configuration 93, the monitoring device 10 monitors the industrial control system 200 only in the active and passive combined manner. For the specific implementation, refer to FIGS. 2 and 3 and the corresponding description.

Figure 2:
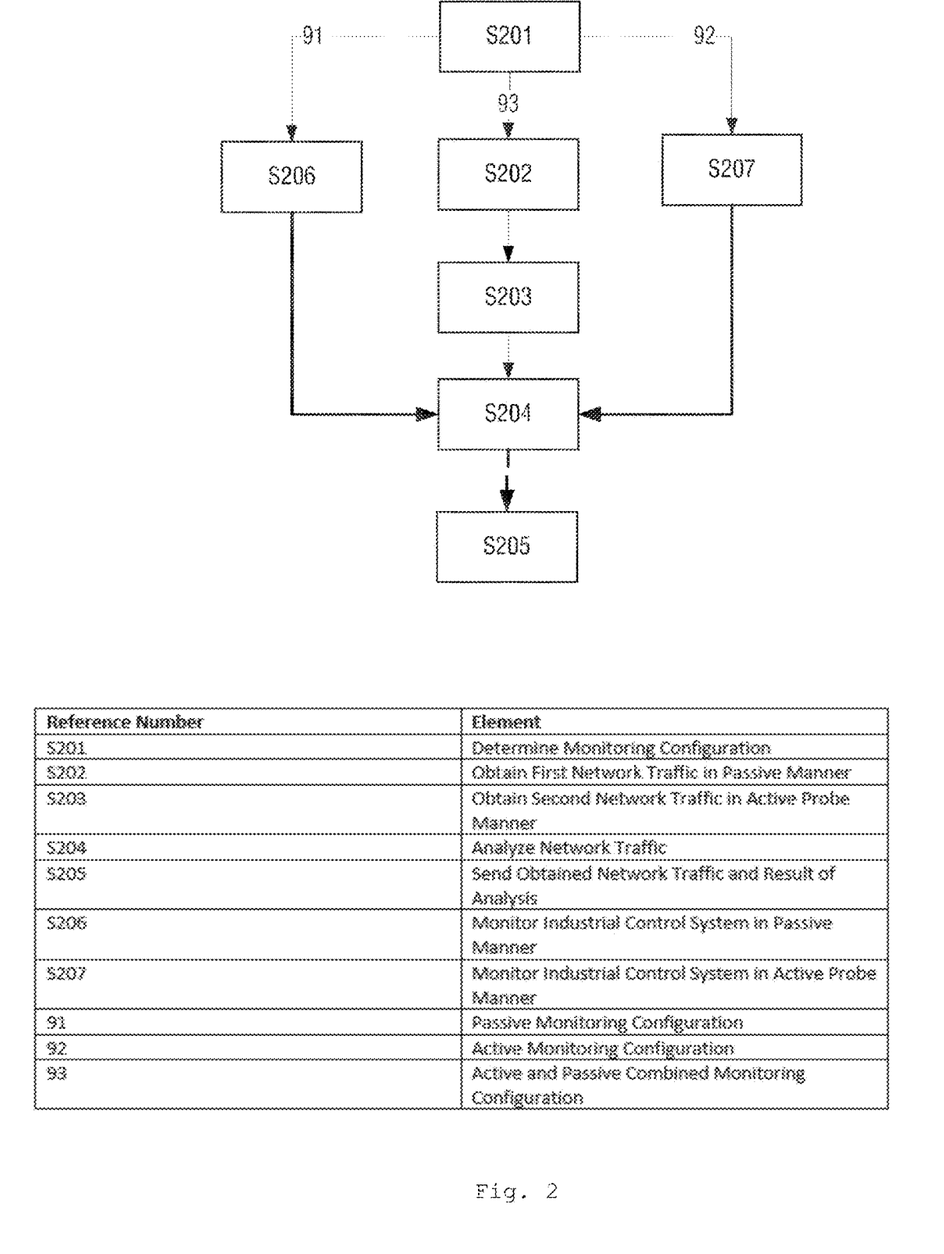
FIG. 2 is a flowchart of the monitoring method provided in one embodiment of the present invention.

The composition of the monitoring system 100 and the monitoring configurations of the monitoring device 10 are described above. The monitoring method provided by the embodiments of the present invention is described below in combination with FIG. 2. As shown in FIG. 2, the method may comprise the following steps:

[Step S201]

In Step S201, the monitoring device 10 determines a monitoring configuration.

As mentioned above, the monitoring configuration may be one of the following configurations:
passive monitoring configuration 91;
active monitoring configuration 92;
active and passive combined monitoring configuration 93.

Alternatively, the monitoring configuration of the monitoring device 10 may be set in advance before the monitoring device is 10 deployed or after the monitoring device is deployed in the industrial control system 200. The monitoring configuration of the monitoring device 10 may be changed when the monitoring device 10 is in service.

It should be noted that Step S201 is not a required step. A monitoring device 10 may adopt only one fixed monitoring configuration to run. In this case, this step is not required to determine the monitoring configuration.

After performing step S201, if the monitoring configuration is determined to be the passive monitoring configuration 91, the monitoring device performs step S206, if the monitoring configuration is determined to be the active monitoring configuration 92, the monitoring device performs step S207, and if the monitoring configuration is determined to be the active and passive combined monitoring configuration 93, the monitoring device performs step S202.

[Step S202]

In step S202, the monitoring device 10 obtains first network traffic 81 transmitted in the industrial control system 200 in the passive monitoring manner. The monitoring device 10 may listen to the first interface 111a for full packet capture. After obtaining the first network traffic 81, the monitoring device 10 may store the first network traffic 81 in a network traffic library. The network traffic library may be located in the monitoring device 10 or may be located in a device connected with the monitoring device 10.

[Step S203]

In step S203, the monitoring device 10 obtains second network traffic 82 transmitted in the industrial control system 200 in the active probe manner for the target industrial device in the industrial control system 200. Wherein, the monitoring device 10 may obtain second network traffic 82 for one target industrial device 30 or a plurality of target industrial devices 30. After obtaining the second network traffic 82, the monitoring device 10 may also store the second network traffic 82 in a network traffic library. The network traffic library may be located in the monitoring device 10 or may be located in a device connected with the monitoring device 10. The network traffic library may be the same as or different from the network traffic library used to store the first network traffic 81.

Step S203 may be performed in different modes, including but not limited to:

Mode 1

After obtaining the first network traffic 81, the monitoring device 10 attempts to obtain characteristics of industrial devices 30 in the industrial control system 200 from the first network traffic 81. For example, the monitoring device 10 may obtain the characteristics of one industrial device 30 from the first network traffic 81 or may obtain the characteristics of a plurality of industrial devices 30 from the first network traffic 81. Then, the monitoring device 10 determines whether it is necessary to monitor the industrial control system 200 in the active probe manner according to the obtained characteristics of the industrial devices 30. For example, if the obtained characteristics of the industrial devices 30 from the first network traffic 81 satisfy the analysis requirements, the monitoring device determines that it is not necessary to monitor the industrial control system 200 in the active probe manner, and otherwise, the monitoring device determines that it is necessary to further monitor the industrial control system 200 in the active probe manner. If determining that it is necessary to monitor the industrial control system 200 in the active probe manner, the monitoring device determines target industrial devices 30 according to the characteristics of industrial devices 30 in the industrial control system 200 in the first network traffic 81. For example, if the first network traffic 81 only contains the characteristics of a part of industrial devices 30 in the monitored LAN, the monitoring device can determine the other industrial devices 30 in the LAN to be target industrial devices 30.

Again for example, if the first network traffic 81 contains the characteristics of an industrial device 30 but the contained characteristics do not satisfy the analysis requirements, the monitoring device determines the industrial device 30 to be the target industrial device 30. Alternatively, during the acquisition of the second network traffic 82 in the corresponding active probe manner, the monitoring device can obtain the characteristics not contained in the first network traffic 81 but required for analyses for the target industrial device 30. After determining the target industrial devices 30, the monitoring device may send third network traffic 83 to the target industrial devices 30 and obtain second network traffic sent by the target industrial devices in response to the third network traffic 83.

For example, if the characteristics of the industrial devices 30 required to be collected for analyses contain information such as device name, IP address, MAC address, industrial device type, hardware version, firmware version and operating system and if the industrial devices 30 are PROFINET devices and are directly connected to the monitored switch, the monitoring device may directly obtain the above-mentioned characteristics in the passive monitoring manner. If the industrial devices 30 do not support PROFIENT or are accessed to an adjacent industrial switch, the monitoring device can obtain only the basic characteristics such as IP address and MAC address in the passive monitoring manner. In this case, the monitoring device needs to further obtain more characteristics in the active probe manner.

Based on the characteristics of industrial devices in the network traffic obtained in a passive monitoring manner, the monitoring device 10 can determine a target industrial device 30 and/or characteristics to be further obtained. Therefore, the monitoring device can obtain targeted network traffic in an active probe manner, avoiding the production of a large amount of extra network traffic and influencing to a lesser extent the running of the industrial control system 200 and industrial devices 30. Meanwhile, the monitoring device can obtain required characteristics. With the running of the industrial control system 200 less influenced, the monitoring device effectively obtains and analyzes characteristics.

Mode 2

When detecting that a new industrial device 30 is accessed to the industrial control system 200, the monitoring device 10 uses the newly accessed industrial device 30 as the target industrial device 30 and obtains second network traffic 82 in the active probe manner for the target industrial device 30.

For example, if determining that a new industrial device 30 is accessed to the industrial control system 200 according to the characteristics of industrial devices 30 in the industrial control system 200 in the first network traffic 81 obtained in the passive monitoring manner, the monitoring device 10 determines that it is necessary to obtain second network traffic 82 transmitted in the industrial control system 200 in the active probe manner and uses the newly accessed industrial device 30 as the target industrial device 30.

Mode 3

When detecting that the characteristics of industrial devices 30 in the industrial control system 200 are changed, the monitoring device 10 uses the industrial device 30 whose characteristics are changed as the target industrial device 30 and obtains second network traffic 82 in the active probe manner for the target industrial device 30. For example, when detecting that an industrial device 30 is online/offline, the software/firmware is upgraded or patched, or the configuration parameters are changed, the monitoring device can obtain the second network traffic 82 in the active probe manner for the industrial device 30.

Alternatively, if determining that the characteristics of an industrial device 30 in the industrial control system 200 are changed according to the characteristics of industrial devices 30 in the industrial control system 200 in the first network traffic 81, the monitoring device 10 determines that it is necessary to obtain second network traffic 82 transmitted in the industrial control system 200 in the active probe manner and uses the industrial device 30 whose characteristics are changed as the target industrial device 30.

Mode 4

The monitoring device 10 can periodically obtain second network traffic 82 transmitted in the industrial control system 200 in the active probe manner for the target industrial device in the industrial control system 200. For example, the monitoring device obtains second network traffic every 24 hours.

As mentioned above, the monitoring device 10 can obtain second network traffic 82 sent by the target industrial device in response to third network traffic 83 by sending third network traffic 83 to the target industrial device 30.

For example, if the industrial device 30 in a network supports the PROFINET protocol, the monitoring device 10 can send a PROFINET DCP Ident_Req broadcast frame as third network traffic 83 for an active probe. After receiving the broadcast frame, any industrial device 30 supporting the PROFINET protocol will respond by sending an Ident_Ok frame containing characteristics such as device type, device name and IP address.

Again for example, if the industrial device 30 in the network supports the Siemens S7Comm protocol, the monitoring device 10 can send a Read_SZL protocol data unit (PDU) as third network traffic 83 for an active probe after establishing a complete S7Comm communication channel. Wherein, the monitoring device 10 can first establish a TPKT channel through negotiation, and then establish a complete S7Comm communication channel. Then, the monitoring device can obtain the characteristics of the probed industrial device 30, such as device type, hardware version and firmware version.

Again for example, if the industrial device 30 in the network supports the simple network management protocol (SNMP), the monitoring device 10 can utilize SNMP Get and Getnext packets to obtain the descriptive information of the industrial device 30, port information of an industrial switch, network interface configuration information such as IP address, mask and gateway, MAC address connected with the industrial switch, and open TCP/IP port No. (or service) on the industrial device 30.

[Step S206]

If the monitoring configuration is determined to be the passive monitoring configuration 91 in step S201, the monitoring device 10 obtains network traffic in the active probe manner in step S206. Similar to the method in step S202, the specific method of obtaining network traffic is not described here again.

[Step S207]

If the monitoring configuration is determined to be the active monitoring configuration 92 in step S201, the monitoring device 10 obtains network traffic in the active probe manner in step S207. Similar to the method of obtaining network traffic in the active probe manner in step S203, the specific method of obtaining network traffic is not described here again.

[Step S204]

The monitoring device 10 analyzes the obtained network traffic.

If the monitoring configuration is the passive monitoring configuration 91, the monitoring device 10 analyzes the network traffic obtained in the passive monitoring manner, that is, analyzes the network traffic obtained in step S206. Alternatively, the result of the analysis may be stored in an analysis result library. For example, the characteristics of industrial devices obtained from the analysis are stored in the analysis result library. The analysis result library may be located in the monitoring device 10 or may be located in a device connected with the monitoring device 10, and may be the same as or different from the network traffic library for storing obtained network traffic.

If the monitoring configuration is the active monitoring configuration 92, the monitoring device 10 analyzes the network traffic obtained in the active probe manner, that is, analyzes the network traffic obtained in step S207. Alternatively, the result of the analysis may be stored in an analysis result library. For example, the characteristics of industrial devices obtained from the analysis are stored in the analysis result library. The analysis result library may be located in the monitoring device 10 or may be located in a device connected with the monitoring device 10, and may be the same as or different from the network traffic library for storing obtained network traffic.

If the monitoring configuration is the active and passive combined monitoring configuration 93, the monitoring device 10 may analyze only the network traffic obtained in the passive monitoring manner, that is, analyze first network traffic 81 obtained in step S202, or may analyze only the network traffic obtained in the active probe manner, that is, analyze second network traffic 82 obtained in step S203, or may analyze both the network traffic obtained in the active probe manner and the network traffic obtained in the passive monitoring manner, that is, analyze both first network traffic 81 obtained in step S202 and second network traffic 82 obtained in step S203. Alternatively, the result of the analysis may be stored in an analysis result library. For example, the characteristics of industrial devices obtained from the analysis are stored in the analysis result library. The analysis result library may be located in the monitoring device 10 or may be located in a device connected with the monitoring device 10, and may be the same as or different from the network traffic library for storing obtained network traffic.

During the analysis of network traffic, the monitoring device 10 can obtain characteristics of the Ethernet, IP layer and TCP/IP layer of the industrial devices 30 in the network from the obtained network traffic. Of course, the obtained characteristics are not limited to those given here only for exemplary purposes.

[Step S205]

In step S205, the monitoring device may send the network traffic and/or the result of the analysis obtained in the previous steps to an analysis center 20 for a further analysis. For example, the monitoring device sends the network traffic and/or the result of the analysis to a device used for industrial security analyses on industrial premises, including on-premise security appliances.

In step S205, the network traffic and/or the result of the analysis obtained in the previous steps may be sent to a workstation 20', and an engineer 60 may further analyze the network traffic and/or the result of the analysis received by the workstation 20'. For example, the engineer may aggregate, prepare and analyze data to further produce the overall characteristics of the industrial control system 200. Based on the overall characteristics, the analysis center 20 and/or workstation 20' may further provide a graphic user interface (GUI) to demonstrate the asset list and the network topology.

Figure 3:
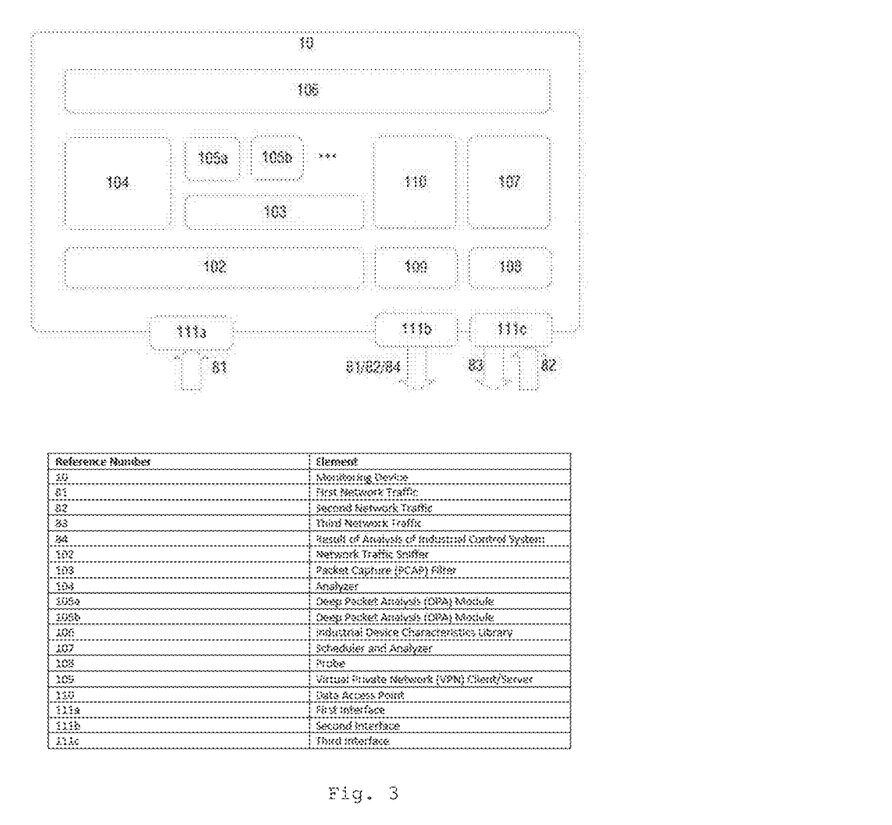
FIGS. 3 and 4 are schematic diagrams of the monitoring devices provided in the embodiments of the present invention.

FIG. 3 is a schematic diagram of a monitoring device 10 provided by the embodiments of the present invention. As shown in FIG. 3, the monitoring device 10 may comprise the following modules:

a network traffic sniffer 102

The network traffic sniffer is configured to obtain first network traffic transmitted in the industrial control system 200 through the first interface 111a in a passive monitoring manner. Alternatively, network traffic may be obtained by use of full packet capture so that characteristics of devices can be obtained from the header and data payload of a packet.

PCAP filter 103

The PCAP filter is configured to distinguish between different protocol packets and/or frames in the network traffic obtained from the monitoring device 10 and send them to the DPA modules of the corresponding protocols. The network traffic processed by the PCAP filter may be network traffic obtained in the passive monitoring manner or the active probe manner. The PCAP filter 103 may distinguish between network traffic of different application protocols from the application layer, and send the distinguished network traffic to the DPA modules of the corresponding application protocols so as to obtain characteristics of industrial devices 30 from the payload of the application protocols.

a basic analyzer 104

The basic analyzer is configured to obtain basic characteristics of Ethernet, IP, and TCP/UDP of industrial devices 30 in the industrial control system, for example, MAC address, IP address, and TCP/UDP port No. (corresponding to the service provided by industrial devices), from the network traffic obtained by the monitoring device 10.

DPA modules 105a, 105b . . . , for different protocols

DPA modules are configured to obtain further characteristics of industrial devices 30 for specific protocols, except the basic characteristics obtained by the basic analyzer 104. The characteristics obtained include but are not limited to: device type, hardware version and firmware version which can be obtained from the payload of a link layer discovery protocol frame, and type identifier which can be obtained from the OT protocol of Siemens S7Comm.

an industrial device characteristics library 106

The industrial device characteristics library is configured to store:

network traffic obtained by the monitoring device 10, including network traffic obtained in the active probe manner and network traffic obtain in the passive monitoring manner, and/or a result of an analysis by the monitoring device 10 of the obtained network traffic, for example, characteristics of industrial devices 30.

Since the monitoring device 10 may obtain a large amount of network traffic, an upper limit can be set for the storage space of the industrial device characteristics library 106. When the upper limit is exceeded, previously stored data will be overwritten by newly stored data.

a scheduler and analyzer 107

The scheduler and analyzer is configured to determine whether the probe 108 needs to obtain further network traffic in the active probe manner based on the network traffic stored in the industrial device characteristics library 106, and obtain richer characteristics therefrom. In addition, the scheduler and analyzer 107 may further make an association analysis of characteristics from different industrial devices and infer the connections (network topology) between the monitored industrial switch, router and other industrial devices 30 thereby. The network traffic and characteristics of industrial devices 30 obtained by the scheduler and analyzer 107 may also be stored in the industrial device characteristics library 106.

a probe 108

The probe is configured to send a detected packet and/or frame to the LAN 50 the monitoring device 10 is connected to through the second interface 111b based on different characteristics, for example, PROFINENT discovery and configuration protocol (DCP) to further obtain network traffic and then obtain richer characteristics of the industrial devices 30.

a VPN client/server 109

The monitoring device 10 may utilize a VPN client to establish a secure VPN channel with an analysis center 20 and/or a workstation 20'.

a data access point 110

Over the established VPN channel, the data access point 110 enables a remote data center and/or a workstation 20' to access the industrial device characteristics library 106 in the monitoring device 10. The monitoring device 10 may adopt a plurality of implementation modes so that the characteristics of industrial devices 30 on the data access point 110 are accessible.

The parameters such as IP address and TCP port No. of the analysis center 20 or the workstation 20' are configured in advance and a data collection agent is deployed on the monitoring device 10 so that the characteristics of industrial devices 30 and/or network traffic can automatically be forwarded to the analysis center 20 or the workstation 20'.

A RESTful application programming interface (API) or a Web graphic user interface (GUI) is provided for the analysis center 20 and/or workstation 20' for data access.

The above-mentioned modules can be considered as computer programming modules stored in at least one memory 112, and when invoking computer-readable instructions in these computer programming modules, at least one processor 113 completes the operations of the modules. Wherein, the industrial device characteristics library 106 may be implemented by computer-readable instructions in terms of data organization and management, and the network traffic and the analysis result stored in the industrial device characteristics library may be stored in at least one memory 112 in terms of hardware.

It should be noted that the module composition shown in FIG. 3 is only an optional implementation mode. Actually, any module division or implementation mode falls within the scope of protection of the present invention, as long as an industrial control system can be monitored and analyzed in the active probe manner and the passive monitoring manner.

FIG. 4 shows an optional implementation mode of the monitoring device 10 provided by the embodiments of the present invention. As shown in FIG. 4, the monitoring device 10 in this implementation mode may comprise:

at least one memory 112, configured to store a computer-readable instruction;

a first interface 111a;

a second interface 111b;

at least one processor 113, coupled with the at least one memory 112. When executing the computer-readable instruction, the at least one processor is configured to: obtain first network traffic 81 transmitted in the industrial control system 200 through the first interface 111a in the passive monitoring manner; determine whether it is necessary to monitor the industrial control system 200 in the active probe manner according to characteristics of industrial devices 30 in the industrial control system 200 in the first network traffic 81; if determining that it is necessary to monitor the industrial control system 200 in the active probe manner, determine a target industrial device 30 according to the characteristics of the industrial devices 30 in the industrial control system 200 in the first network traffic 81, send third network traffic 83 to the determined target industrial device 30 through the second interface 111b, and obtain, through the second interface 111b, second network traffic 82 sent by the target industrial device 30 in response to the third network traffic 83.

Wherein, the memory 112, the processor 113 and the interfaces may be connected together through a bus.

Alternatively, when determining whether it is necessary to monitor the industrial control system 200 in the active probe manner according to characteristics of industrial devices 30 in the industrial control system 200 in the first network traffic 81, the at least one processor 113 is specifically configured to determine whether it is necessary to adopt the active probe manner for the industrial control system 200 to obtain second network traffic 82 transmitted in the industrial control system 200 if determining that a new industrial device 30 is accessed to the industrial control system 200 according to the characteristics of the industrial devices 30 in the industrial control system 200 in the first network traffic 81; when determining a target industrial device 30, the at least one processor 113 is specifically configured to use the newly accessed industrial device 30 as the target industrial device 30.

Alternatively, when determining whether it is necessary to monitor the industrial control system 200 in the active probe manner according to characteristics of industrial devices 30 in the industrial control system 200 in the first network traffic 81, the at least one processor 113 is specifically configured to determine whether it is necessary to adopt the active probe manner for the industrial control system 200 to obtain second network traffic 82 transmitted in the industrial control system 200 if determining that the characteristics of industrial devices 30 in the industrial control system 200 are changed according to the characteristics of the industrial devices 30 in the industrial control system 200 in the first network traffic 81; when determining a target industrial device 30, the at least one processor 113 is specifically configured to use the industrial device 30 whose characteristics are changed as the target industrial device 30.

Alternatively, the at least one processor 113 is further configured to determine the monitoring configuration as one of the following:

passive monitoring configuration 91;

active monitoring configuration 92;

active and passive combined monitoring configuration 93.

the at least one processor 113 is specifically configured to obtain, through the first interface 111a, first network traffic 81 transmitted in the industrial control system 200 in a passive monitoring manner and determine whether it is necessary to monitor the industrial control system 200 in the active probe manner according to characteristics of industrial devices 30 in the industrial control system 200 in the first network traffic 81 if determining the monitoring configuration as the active and passive combined monitoring configuration 93, and determine a target industrial device 30 according to the characteristics of the industrial device 30 in the industrial control system 200 in the first network traffic 81, send third network traffic 83 to the determined target industrial device 30 through the second interface 111b, and obtain, through the second interface 111b, second network traffic 82 sent by the target industrial device 30 in response to the third network traffic 83 if determining that it is necessary to monitor the industrial control system 200 in the active probe manner;

the at least one processor 113 is further configured to monitor the industrial control system 200 only in the passive monitoring manner if determining the monitoring configuration as the passive monitoring configuration 91, and monitor the industrial control system 200 only in the active probe manner if determining the monitoring configuration as the active monitoring configuration 92.

Alternatively, the device may further comprise a third interface 111c, and the at least one processor 113 is further configured to send at least one of the following contents to an analysis center 20 for an analysis and/or to a workstation 20' through a third interface 111c:

first network traffic 81;
second network traffic 82;
Result 84 of an analysis of the industrial control system 200 according to the first network traffic 81 and/or the second network traffic 82.

For the operations performed by the at least one processor 113, refer to the corresponding description in FIGS. 2 and 3; they are not described here again.

The embodiments of the present invention further provide a computer-readable medium. A computer-readable instruction is stored in the computer-readable medium and a processor executes any above-mentioned method when the computer-readable instruction is executed by the processor. Specifically, a system or device equipped with a computer-readable storage medium may be provided. Software program codes which can realize the function in any of above-mentioned embodiments are stored in the computer-readable storage medium and the computer or processor of the system or device can read out and execute the computer-readable instruction stored in the computer-readable storage medium.

In this case, program codes read from the computer-readable storage medium themselves can realize the function in any of the above-mentioned embodiments. Therefore, computer-readable codes and the computer-readable storage medium where computer-readable codes are stored constitute a part of the present invention.

Embodiments of computer-readable storage media include floppy disks, hard disks, magneto-optical disks, compact disks (for example, compact disk read-only memory (CD-ROM)), compact disk-recordable (CD-R), compact disk-rewritable (CD-RW), digital video disk-read only memory (DVD-ROM), digital versatile disk-random access memory (DVD-RAM), digital versatile disk-recordable (DVD-RW), digital versatile disk-rewritable (DVD+RW), magnetic tape, non-volatile memory card, and read-only memory (ROM). Alternatively, program codes can be downloaded from the server computer or cloud over a communication network.

In a word, the embodiments of the present invention provide a monitoring method, device and system for an industrial control system, and a computer-readable medium, and the application scenarios thereof include but are not limited to the following two:

centralized device management of the industrial control system

The above-mentioned monitoring device is deployed and configured in each LAN of the industrial control system, and characteristics of industrial devices connected to industrial switches or routers in the industrial control system are obtained in the active probe manner and passive monitoring manner. The obtained network traffic and/or characteristics of industrial devices are sent to a central analysis center for further data aggregation, preparation and analysis so as to generate the asset list and the network topology of the industrial control system.

routine operations for a part of the industrial control system

Even without any central analysis center, engineers can still directly connect monitoring devices. They can use terminals such as computers to access the Web GUI on the monitoring device, obtain the asset list and network topology in the LAN the monitoring device is connected to, and obtain the local characteristics in the whole industrial control system.

Based on the characteristics of the industrial control system, the embodiments of the present invention combine the advantages of the active probe manner and the passive monitoring manner and make up for the disadvantages of the two manners. For example, if the passive monitoring manner is adopted, the communication in the industrial control system will not be influenced, but limited characteristics can be obtained. If the active probe manner is adopted, more characteristics can be obtained, but extra network traffic will be injected into the industrial control system. Common scanning will bring about adverse influence on the running of the industrial control system. The advantages and disadvantages of the two manners are considered in the embodiments of the present invention. Not only is the collection of characteristics of industrial devices implemented, but also the adverse influence on the industrial control system is avoided. A target active probe is performed based on the characteristics of industrial devices obtained in the passive monitoring manner, and characteristics of industrial devices are further obtained from necessary network traffic of the industrial control system. Therefore, the advantages of the active probe manner and the passive monitoring manner are considered in the embodiments of the present invention, and the adverse influence of common scanning is avoided.

In addition, in the embodiments of the present invention, the edge computing solution is applied to the monitoring of the industrial control system. In an optional implementation mode, the monitoring device completes major calculation and analysis operations and sends the result of the analysis to an analysis center and/or workstation, avoiding the transmission of a large amount of network traffic. Even without a central analysis center, the monitoring device can work independently.

It should be noted that not all steps or modules in the above-mentioned flowcharts and system structure diagrams are required, and some steps or modules can be omitted, depending on the actual requirements. The execution sequence of the steps is not fixed and may be adjusted as required. The system structures described in the above-mentioned embodiments can be physical structures or logical structures. That is to say, some modules may be realized by a physical entity, or some modules may be realized by a plurality of physical entities or may jointly be realized by some components in a plurality of self-contained devices.

In the above-mentioned embodiments, hardware units can mechanically or electrically be realized. For example, a hardware unit can comprise a permanent dedicated circuit or logic (for example, special processor, FPGA, or ASIC) to complete the corresponding operations. A hardware unit may further comprise a programmable logic or circuit (for example, a general processor or other programmable processor) and may complete the corresponding operations through temporary software setting. The specific implementation mode (mechanical mode, or dedicated permanent circuit, or circuit which is temporarily set) can be determined on the basis of consideration of cost and time.

The present invention is revealed and described above in detail in combination with the drawings and preferred embodiments. However, the present invention is not limited to the disclosed embodiments. On the basis of the plurality of above-mentioned embodiments, those skilled in the art can know that more embodiments of the present invention can be obtained by combining the code review in the above-mentioned different embodiments, and all these embodiments should also fall within the scope of protection of the present invention.

The invention claimed is:

1. A monitoring method for an industrial control system, the monitoring method comprising:
obtaining first network traffic transmitted in the industrial control system in a passive monitoring manner;
determining whether it is necessary to monitor the industrial control system in an active probe manner according to characteristics of industrial devices in the industrial control system in the first network traffic; and
upon determining that it is necessary to monitor the industrial control system in an active probe manner,
determining a target industrial device according to the characteristics of the industrial devices in the industrial control system in the first network traffic,
sending third network traffic to the target industrial device determined, and
obtaining second network traffic sent by the target industrial device in response to the third network traffic.

2. The monitoring method of claim 1, wherein the determining of whether it is necessary to monitor the industrial control system in an active probe manner according to characteristics of industrial devices in the industrial control system in the first network traffic comprises:
upon determining that a new industrial device is accessed to the industrial control system according to the characteristics of the industrial devices in the industrial control system in the first network traffic,
determining whether it is necessary to adopt an active probe manner for the industrial control system to obtain second network traffic transmitted in the industrial control system; and
wherein the determining of the target industrial device comprises:
using the industrial device newly accessed as the target industrial device.

3. The monitoring method of claim 1, wherein the determining of whether it is necessary to monitor the industrial control system in an active probe manner according to characteristics of industrial devices in the industrial control system in the first network traffic comprises:
upon determining that the characteristics of the industrial devices in the industrial control system are changed according to the characteristics of the industrial devices in the industrial control system in the first network traffic,
determining that it is necessary to adopt an active probe manner for the industrial control system to obtain second network traffic transmitted in the industrial control system; and
wherein the determining of the target industrial device comprises:
using the industrial device whose characteristics are changed as the target industrial device.

4. The monitoring method of claim 1, further comprising:
determining a monitoring configuration as one of:
a passive monitoring configuration;
an active monitoring configuration; and
an active and passive combined monitoring configuration;
wherein upon determining the monitoring configuration as the active and passive combined monitoring configuration, performing
the obtaining of the first network traffic transmitted in the industrial control system in a passive monitoring manner and
the determining of whether it is necessary to monitor the industrial control system in an active probe manner according to characteristics of industrial devices in the industrial control system in the first network traffic;
wherein upon determining that it is necessary to monitor the industrial control system in an active probe manner,
performing the determining of the target industrial device according to the characteristics of the industrial devices in the industrial control system in the first network traffic,
sending third network traffic to the determined target industrial device, and
obtaining second network traffic sent by the target industrial device in response to the third network traffic; and
wherein the method further comprises:
upon determining the monitoring configuration as the passive monitoring configuration, monitoring the industrial control system only in a passive monitoring manner, and
upon determining the monitoring configuration as the active monitoring configuration, monitoring the industrial control system only in an active probe manner.

5. The monitoring method of claim 1, further comprising:
sending, to an analysis center for an analysis and/or to a workstation through a third interface, at least one of:
the first network traffic;
the second network traffic, and
a result of an analysis of the industrial control system according to at least one of the first network traffic and the second network traffic.

6. A monitoring device for an industrial control system, comprising:
at least one memory, configured to store a computer-readable instruction;
a first interface;
a second interface;
at least one processor, coupled with the at least one memory and upon the computer-readable instruction being executed, configured to
obtain first network traffic transmitted in the industrial control system through the first interface in a passive monitoring manner;
determine whether it is necessary to monitor the industrial control system in an active probe manner according to characteristics of industrial devices in the industrial control system in the first network traffic; and
upon determining that it is necessary to monitor the industrial control system in an active probe manner,
determine a target industrial device according to the characteristics of the industrial devices in the industrial control system in the first network traffic,
send third network traffic to the target industrial device determined through the second interface, and
obtain, through the second interface, second network traffic sent by the target industrial device in response to the third network traffic.

7. The monitoring device of claim 6, wherein
when determining whether it is necessary to monitor the industrial control system in an active probe manner according to characteristics of industrial devices in the industrial control system in the first network traffic, the at least one processor is configured to determine whether it is necessary to adopt an active probe manner for the industrial control system to obtain second network traffic transmitted in the industrial control system upon determining that a new industrial device is accessed to the industrial control system according to the characteristics of the industrial devices in the industrial control system in the first network traffic; and when determining a target industrial device, the at least one processor is configured to use the industrial device newly accessed as the target industrial device.

8. The monitoring device of claim 6, wherein when determining whether it is necessary to monitor the industrial control system in an active probe manner according to characteristics of industrial devices in the industrial control system in the first network traffic, the at least one processor is configured to determine whether it is necessary to adopt an active probe manner for the industrial control system to obtain second network traffic transmitted in the industrial control system upon determining that the characteristics of the industrial devices in the industrial control system are changed according to the characteristics of the industrial devices in the industrial control system in the first network traffic; and when determining a target industrial device, the at least one processor is configured to use the industrial device whose characteristics are changed as the target industrial device.

9. The monitoring device of claim 6, wherein the at least one processor is further configured to determine a monitoring configuration as one of:

a passive monitoring configuration;

an active monitoring configuration; and an active and passive combined monitoring configuration; and wherein the at least one processor is configured to obtain, through the first interface, first network traffic transmitted in the industrial control system in a passive monitoring manner and determine whether it is necessary to monitor the industrial control system in an active probe manner according to characteristics of industrial devices in the industrial control system in the first network traffic upon determining the monitoring configuration as the active and passive combined monitoring configuration, and determine a target industrial device according to the characteristics of the industrial devices in the industrial control system in the first network traffic, send third network traffic to the determined target industrial device through the second interface, and obtain, through the second interface, second network traffic sent by the target industrial device in response to the third network traffic upon determining that it is necessary to monitor the industrial control system in an active probe manner; and wherein the at least one processor is further configured to monitor the industrial control system only in a passive monitoring manner upon determining the monitoring configuration as the passive monitoring configuration, and monitor the industrial control system only in an active probe manner upon determining the monitoring configuration as the active monitoring configuration.

10. The monitoring device of claim 6, further comprising:

a third interface, and wherein the at least one processor is further configured to send through a third interface, to at least one of an analysis center for an analysis and a workstation, at least one of:

the first network traffic;

the second network traffic; and a result of an analysis of the industrial control system according to at least one of the first network traffic and the second network traffic.

11. A non-transitory computer-readable medium, storing a computer-readable instruction, wherein upon invoking the computer-readable instruction, a processor is configured to perform at least:

obtaining first network traffic transmitted in an industrial control system in a passive monitoring manner;

determining whether it is necessary to monitor the industrial control system in an active probe manner according to characteristics of industrial devices in the industrial control system in the first network traffic; and upon determining that it is necessary to monitor the industrial control system in an active probe manner, determining a target industrial device according to the characteristics of the industrial devices in the industrial control system in the first network traffic, sending third network traffic to the target industrial device determined, and obtaining second network traffic sent by the target industrial device in response to the third network traffic.

12. The non-transitory computer-readable medium of claim 11, wherein when invoking the computer-readable instruction and determining whether it is necessary to monitor the industrial control system in an active probe manner according to characteristics of industrial devices in the industrial control system in the first network traffic, the processor is configured to perform:

determining that it is necessary to adopt an active probe manner for the industrial control system to obtain second network traffic transmitted in the industrial control system upon determining that a new industrial device is accessed to the industrial control system according to the characteristics of the industrial devices in the industrial control system in the first network traffic; and wherein when invoking the computer-readable instruction and determining a target industrial device, the processor is configured to perform:

using the newly accessed industrial device as the target industrial device.

13. The computer-readable medium of 11, wherein when invoking the computer-readable instruction and determining whether it is necessary to monitor the industrial control system in an active probe manner according to characteristics of industrial devices in the industrial control system in the first network traffic, the processor is configured to perform:

determining it is necessary to adopt an active probe manner for the industrial control system to obtain second network traffic transmitted in the industrial control system upon determining that the characteristics of the industrial devices in the industrial control system are changed according to the characteristics of the industrial devices in the industrial control system in the first network traffic; and wherein when invoking the computer-readable instruction and determining a target industrial device, the processor is configured to perform:

using the industrial device whose characteristics are changed as the target industrial device.

14. The computer-readable medium of claim 11, wherein when invoking the computer-readable instruction, the processor is further configured to perform:
determining a monitoring configuration as one of:
a passive monitoring configuration;
an active monitoring configuration; and
an active and passive combined monitoring configuration;
upon determining the monitoring configuration as the active and passive combined monitoring configuration, performing the obtaining first network traffic transmitted in the industrial control system in a passive monitoring manner and determining whether it is necessary to monitor the industrial control system in an active probe manner according to characteristics of industrial devices in the industrial control system in the first network traffic; and upon determining that it is necessary to monitor the industrial control system in an active probe manner, the processor is further configured to perform the
determining of the target industrial device according to the characteristics of the industrial devices in the industrial control system in the first network traffic,
sending third network traffic to the target industrial device determined, and
obtaining second network traffic sent by the target industrial device in response to the third network traffic;
monitoring the industrial control system only in a passive monitoring manner upon determining the monitoring configuration as the passive monitoring configuration; and
monitoring the industrial control system only in an active probe manner upon determining the monitoring configuration as the active monitoring configuration.

15. The non-transitory computer-readable medium of claim 11, wherein when invoking the computer-readable instruction, the processor is further configured to perform:
sending, to at least one of an analysis center for an analysis and to a workstation through a third interface, at least one of:
the first network traffic;
the second network traffic; and
a result of an analysis of the industrial control system according to at least one of the first network traffic and the second network traffic.

16. The monitoring method of claim 2, wherein the determining of whether it is necessary to monitor the industrial control system in an active probe manner according to characteristics of industrial devices in the industrial control system in the first network traffic comprises:
upon determining that the characteristics of the industrial devices in the industrial control system are changed according to the characteristics of the industrial devices in the industrial control system in the first network traffic,
determining that it is necessary to adopt an active probe manner for the industrial control system to obtain second network traffic transmitted in the industrial control system; and
wherein the determining of the target industrial device comprises:
using the industrial device whose characteristics are changed as the target industrial device.

17. The monitoring method of claim 2, further comprising:
determining the monitoring configuration as one of:
passive monitoring configuration;
active monitoring configuration; and
active and passive combined monitoring configuration;
wherein upon determining the monitoring configuration as the active and passive combined monitoring configuration, performing
the obtaining of the first network traffic transmitted in the industrial control system in a passive monitoring manner and
the determining of whether it is necessary to monitor the industrial control system in an active probe manner according to characteristics of industrial devices in the industrial control system in the first network traffic;
wherein upon determining that it is necessary to monitor the industrial control system in an active probe manner,
performing the determining of the target industrial device according to the characteristics of the industrial devices in the industrial control system in the first network traffic,
sending third network traffic to the determined target industrial device, and
obtaining second network traffic sent by the target industrial device in response to the third network traffic; and
wherein the method further comprises:
upon determining the monitoring configuration as the passive monitoring configuration, monitoring the industrial control system only in a passive monitoring manner, and
upon determining the monitoring configuration as the active monitoring configuration, monitoring the industrial control system only in an active probe manner.

18. The monitoring method of claim 2, further comprising:
sending, at least one of to an analysis center for an analysis and to a workstation through a third interface, at least one of:
the first network traffic,
the second network traffic, and
a result of an analysis of the industrial control system according to at least one of the first network traffic and the second network traffic.

19. The monitoring device of claim 7, wherein
when determining whether it is necessary to monitor the industrial control system in an active probe manner according to characteristics of industrial devices in the industrial control system in the first network traffic, the at least one processor is configured to determine whether it is necessary to adopt an active probe manner for the industrial control system to obtain second network traffic transmitted in the industrial control system upon determining that the characteristics of the industrial devices in the industrial control system are changed according to the characteristics of the industrial devices in the industrial control system in the first network traffic; and
when determining a target industrial device, the at least one processor is configured to use the industrial device whose characteristics are changed as the target industrial device.

20. The monitoring device of claim 7, wherein the at least one processor is further configured to determine a monitoring configuration as one of:
a passive monitoring configuration;
an active monitoring configuration; and an active and passive combined monitoring configuration; and wherein the at least one processor is configured to obtain, through the first interface, first network traffic transmitted in the industrial control system in a passive monitoring manner and determine whether it is necessary to monitor the industrial control system in an active probe manner according to characteristics of industrial devices in the industrial control system in the first network traffic upon determining the monitoring configuration as the active and passive combined monitoring configuration, and determine a target industrial device according to the characteristics of the industrial devices in the industrial control system in the first network traffic, send third network traffic to the determined target industrial device through the second interface, and obtain, through the second interface, second network traffic sent by the target industrial device in response to the third network traffic upon determining that it is necessary to monitor the industrial control system in an active probe manner; and wherein the at least one processor is further configured to monitor the industrial control system only in a passive monitoring manner upon determining the monitoring configuration as the passive monitoring configuration, and monitor the industrial control system only in an active probe manner upon determining the monitoring configuration as the active monitoring configuration.

\* \* \* \* \*